J. H. Golding,
Cutting Leather,
N° 85,085. Patented Dec. 22, 1868.
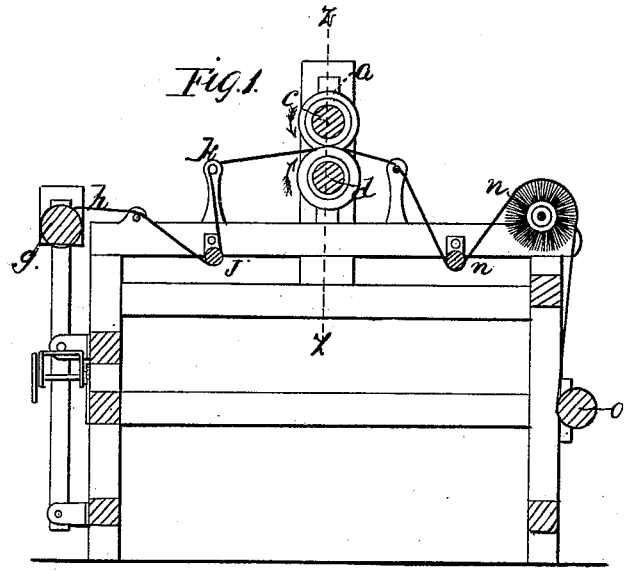
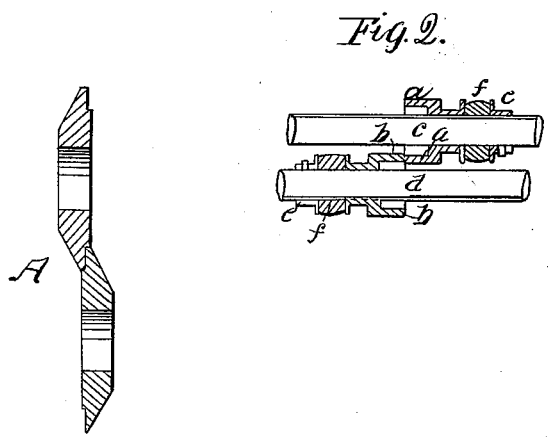
Witnesses.
W B Crosby.
Francis Gould.
Inventor.
James. W. Golding

United States Patent Office.

JAMES H. GOLDING, OF LIVERPOOL, ENGLAND, ASSIGNOR TO HIMSELF AND PATRICK MARTIN, OF SAME PLACE.

Letters Patent No. 85,085, dated December 22, 1868.

IMPROVED CYLINDRICAL CUTTER FOR LEATHER AND OTHER MATERIALS.

The Schedule referred to in these Letters Patent and making part of the same.

*To all whom it may concern:*

Be it known that I, JAMES H. GOLDING, of Liverpool, England, residing in Boston, county of Suffolk, and State of Massachusetts, have invented an Improvement in Cylindrical Cutters for Leather or other sheet-material; and I do hereby declare that the following, taken in connection with the drawings which accompany and form part of this specification, is a description of my invention, sufficient to enable those skilled in the art to practise it.

For cutting leather and skins into strips, such as belting, shoe-binding, &c., disk-knives or cutters have been used in pairs, the knives of each pair being placed on separate shafts, and so arranged thereon that their flat surfaces are located in the same plane, the said flat surfaces being kept in contact by springs, which, being under stress, tend to move the knives or cutters towards each other.

The difficulty with such cutters is, that each operates to wear into the flat face of its fellow a rebate, as represented, in an exaggerated form, in the detail A, of the drawing, and this wear also dulls the edge of each disk, so that constant or frequent grinding of the disks is necessary to keep the cutters in working-order.

By my invention, I produce circular cutters which operate in pairs, each cutter of each pair being arranged on its shaft, like the disk-cutters before alluded to, my circular cutters being, at their operative parts, hollow cylinders, with their plane faces in contact, and so located and arranged, with respect to each other, that the end plane or base of each hollow cylinder wears itself and its fellow always in and to a true plane, by which the cutting-corner or angle of each hollow cylinder, formed by the junction of the outer periphery with the base-plane, is always kept sharp.

Solid cylinders, working together in pairs, arranged substantially as are the disk-knives before alluded to, and as are my hollow cylindrical knives, wear into each other in the way I have described for the disk-knives, and require frequent grinding.

My invention, therefore, is an improvement upon pairs of solid cylindrical knives or cutters, as well as upon disk-knives or cutters working together in pairs.

In the drawings—

Figure 1 shows a cross-section of a machine arranged with cutters, embodying my invention, the machine being shown as adapted to present and convey flexible material to the cutters, though the cutters will also operate perfectly in slitting or cutting into strips, sheets, or bars, or plates of rigid material.

Figure 2, of the drawings, shows a section on the line $z\ z$ of fig. 1, exhibiting clearly the relation of the flat ends of the hollow cylindrical knives or cutters.

The hollow cylindrical part of one cutter is marked $a$, and the corresponding part of the other cutter is marked $b$, both cutters having extensions beyond said parts, fitting on their respective shafts, $c$ and $d$, so that while the cutters must turn with the shafts, they can also slide endwise thereon toward each other, the shafts having each a spline-way cut therein, and a spline or pin in each cutter fitting into the spline-way of its shaft.

The shafts are geared together, so that they and the cutters thereon will turn in the direction indicated by the arrows in fig. 1.

On these shafts are secured collars $e$, by set-screws, or otherwise, and rubber or other suitable springs, $f$, are compressed between said collars and those ends of the cutters which do not come into contact with each other.

The shafts $c$ and $d$ are located at such a distance apart as to have the inner or concave surface of each hollow cylinder, at the crossing or intersection of the faces of the two hollow cylinders or cutters, coincide at one point with the outer or convex surface of the other hollow cylindrical cutter, and the shafts may, with good results, or at least without any bad effect, be located even a little nearer together than the described location of the cutters would bring them, and, in either case, the flat face of each will wipe and wear the entire flat face of the other cutter, so that no groove or rebate can be worn by one cutter into the flat face of the other, and hence it follows that the faces of the hollow cylindrical cutters must always wear in perfect planes, by which the sharpness of the cutting-corner or angle of each cutter will be preserved or maintained.

For cutting a wide sheet into several strips, several pairs of cutters, like those described, may be mounted on the shafts $c$ and $d$.

The rest of the machine shown is not of the essence of my invention, and merely shows a way of presenting and conveying flexible material to the action of my cutters.

$g$ denotes a roll, on which is wound the flexable material, $h$, to be cut, said material passing over bar $i$, roll $j$, and bar $k$, to smooth the material $h$, and produce tension thereupon. The material, after passing the cutters, and being operated on by them, passes over bar $l$, roll $m$, to feed-roll $n$, by which the material is drawn off of roll $g$, and is drawn through the machine to be delivered to the take-up roll $o$, on which it is wound up.

The delivery-roll $g$ and take-up roll $o$, or either of them, may have provision for lateral adjustment to properly gauge the presentation of the material to the cutters.

For cutting sheets of stiff material, pairs of feed-rolls may be employed on both or either side of the cutters, to present to and to remove the material from the cutters, or a table or rolls, or a carriage, may be provided, and the material may be pushed thereon to the action of the cutters, gauges being used, if desirable, to determine the relation of the presentation of the material to the cutters.

I claim a cutting-machine, in which are combined hollow cylindrical cutters, so arranged that their flat faces will wear each other in planes, substantially as described.

JAMES H. GOLDING.

Witnesses:
J. B. CROSBY,
FRANCIS GOULD.